Dec. 10, 1940.   J. FRASER   2,224,540
LIQUID MEASURING AND DISPENSING APPARATUS
Filed Feb. 13, 1940   2 Sheets-Sheet 2
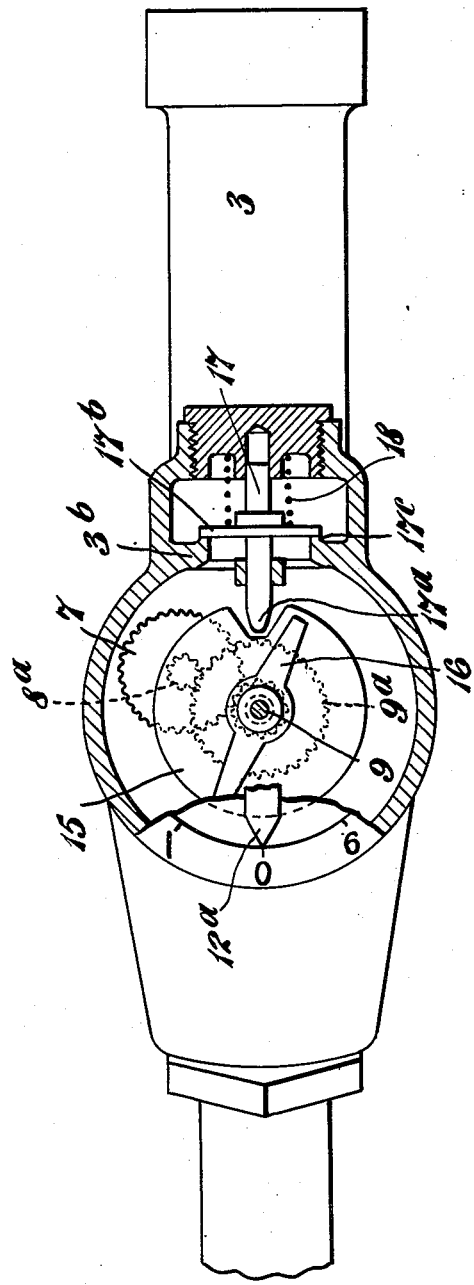

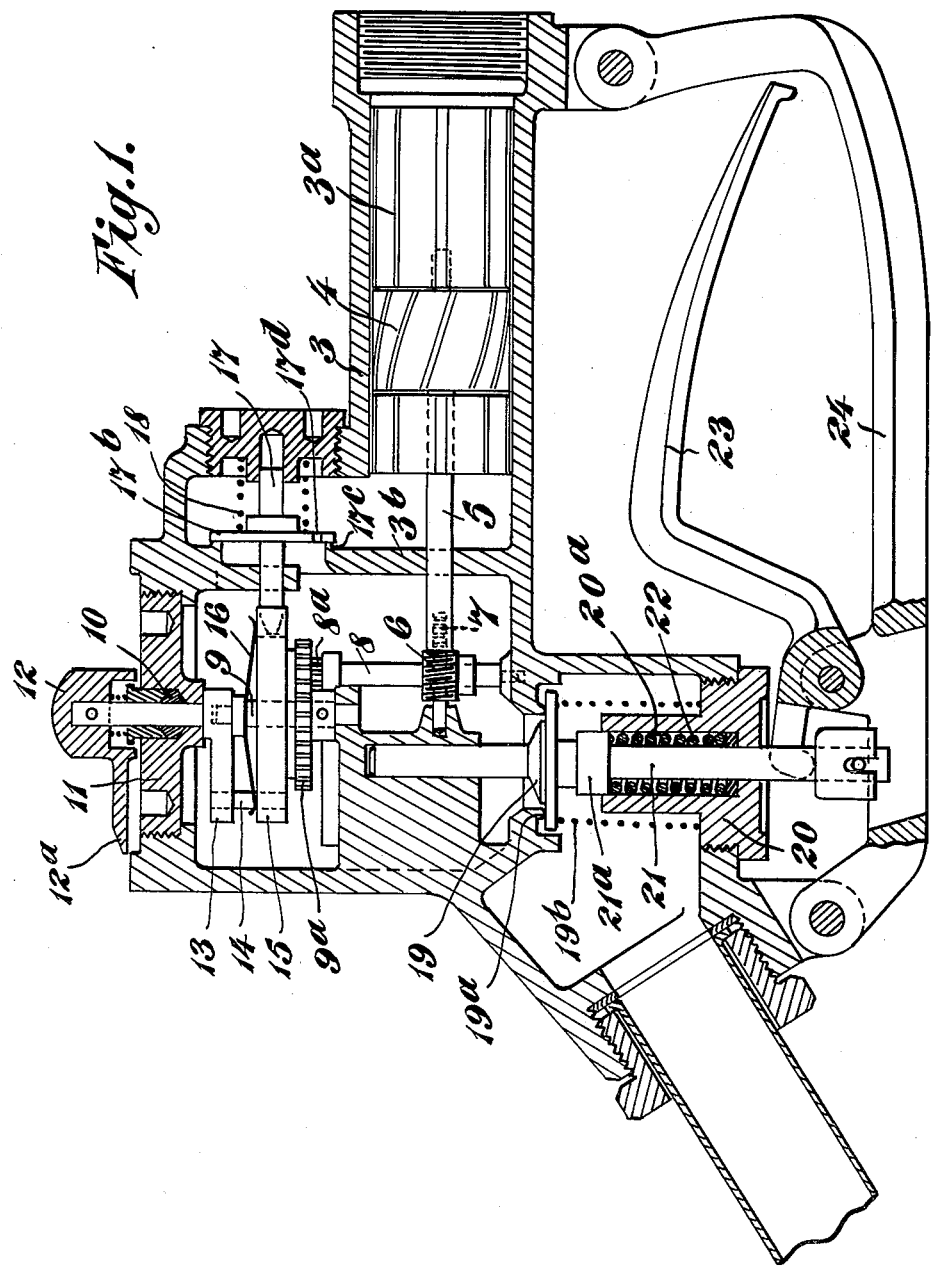

Patented Dec. 10, 1940

2,224,540

UNITED STATES PATENT OFFICE 2,224,540

LIQUID MEASURING AND DISPENSING APPARATUS

John Fraser, London, England, assignor to Avery-Hardoll Limited, London, England Application February 13, 1940, Serial No. 318,732
In Great Britain February 7, 1939

3 Claims. (Cl. 221—101)

This invention has reference to improvements relating to liquid measuring and dispensing apparatus with especial reference to apparatus for this purpose of the kind known as meter pumps and in which delivery of liquid takes place at the delivery position through a valve controlled nozzle which is manipulated by the operator and in which after the major proportion of a delivery of a predetermined quantity has been made the operator is permitted to enable to come into action a mechanism which results in the automatic cessation of delivery as soon as the whole of the predetermined quantity has been delivered and the present invention has for its object the provision of an improved means in conjunction with liquid measuring and dispensing apparatus of the said kind whereby the operator is able from the operating position to determine more readily the quantity of liquid to be dispensed at any one delivery operation.

According to the invention the improved liquid measuring and dispensing apparatus of the kind aforesaid is characterised by the incorporation in or adjacent the delivery nozzle of an auxiliary metering device which is actuated by the flow of liquid as it passes to the discharge orifice and by the association with the said metering device of means which automatically imposes a check on the delivery when a predetermined quantity has been delivered.

The invention will now be described with particular reference to the accompanying sheets of drawings, wherein:

Figure 1 is a longitudinal vertical section of a discharge nozzle according to the invention and which is adapted for use with an electrically driven meter pump utilising a control mechanism as described and claimed in the United States Patent No. 2,161,920.

Figure 2 is a sectional plan view of Figure 1.

The casing 3 of the discharge nozzle is provided in the inlet section 3ª thereof with a spiral meter drum 4 which is fixed on a shaft 5 rotatably mounted in bearings carried by the said casing 3. This shaft 5 carries adjacent that end thereof which is opposite to the end portion on which the spiral meter drum 4 is mounted, a worm 6 which meshes with a worm wheel 7 mounted on a vertically disposed shaft 8 which is rotatably mounted in the interior of a section of the body casing 3 hereinafter referred to as the outlet section of the said body casing 3. The vertically disposed shaft 8 through pinions 8ª and 9ª rotates another vertically disposed shaft 9. The upper portion of the shaft 9 is journaled in the base of a setting finger 13 that has a stem which projects through a gland 10 in a cover cap 11 for the upper end of the outlet section of the body casing 3. Pinned to the upper projecting end of the stem is a setting knob 12 having an indicating finger 12ª which cooperates with an externally disposed graduated dial 12ᵇ arranged concentrically with the cover cap 11. The setting finger 13 which is disposed within the casing 3 co-operates with a pin 14 carried by a settable disc 15 loosely mounted on the shaft 9, said settable disc 15 having a notch 15ª at one part of the periphery thereof for a purpose to be described hereinafter. The settable disc 15 is associated with the shaft 9 for driving purposes by a spring washer 16 which presses the face of the said disc 15 which is presented to the pinion 9ª into frictional driving engagement with the said pinion 9ª. The notch 15ª in the settable disc 15 co-operates with the rounded end of a plunger 17ª which is formed as an extension of a horizontal valve rod 17 which is slidably mounted in bearings carried by the casing 3 and a plug screwed into the casing said valve rod 17 carrying a valve 17ᵇ which co-operates with a seating 17ᶜ formed in a partition 3ᵇ which separates the outlet section of the body casing 3 from the inlet section 3ª. The valve 17ᵇ is formed with a through passage 17ᵈ, hereinafter termed the dribble passage 17ᵈ, so that liquid can pass from the inlet section 3ª to the outlet section, albeit at a lower rate, even when the valve 17ᵇ is closed on to its seating 17ᶜ. The valve 17ᵇ tends to move on to the aforesaid seating 17ᶜ under the influence of a coil spring 18. The outlet from the outlet section of the casing 3 is controlled by a valve 19 which co-operates with a seating 19ª and the said valve 19 tends to be maintained in the closed position by a light coil spring 19ᵇ which is interposed between the underface of the said valve 19 and a bottom plug 20 which screws into an opening in the lower part of the casing 3. Slidably mounted within the bottom plug 20 is a rod 21 the upper end of which abuts the underside of the valve 19. This rod 21 is provided with a collar 21ª which is slidably mounted within a recess 20ª in the bottom plug 20 and between this collar 21ª and the bottom of the recess 20ª is located a relatively strong spring 22. The lower end of the rod 21 co-operates with the shorter arm of a trigger lever 23 which is pivotally mounted in a guard 24 secured to the casing 3. The actual discharge orifice is constituted by the outer end of a tubular member 25 in accordance with known practice and the association of the control valve 19 with the springs 19b and 22 and the rod 21 and trigger lever 23 and their manner of operation is likewise known in practice.

The liquid entering the inlet section 3ᵃ is delivered by an electrically driven meter pump having the control mechanism described in United States Patent No. 2,161,920. That control mechanism is adapted to interrupt the flow after the delivery of an exact number of volume units, such as half gallons, but the control mechanism cannot operate until the valve 17b has closed, so as to reduce the flow to a dribble stream. The apparatus controlled by the spiral meter drum 4, which is only an approximate measuring device, is so calibrated that the valve 17b closes during the delivery of the last half gallon or other unit of volume, just before the delivery of the preselected number of volume units has been completed.

The control mechanism, constructed as shown in U. S. Patent No. 2,161,920, is governed by a stationary metering device for accurately measuring the flow. When the valve 17b closes the resulting sharp reduction in the rate of flow sets the control mechanism in operation, and such mechanism arrests the flow upon completion of the delivery of the last full unit of volume. Thus the operator is able to preselect the number of volume units to be delivered by setting the indicating finger 12ᵃ, although the accurate measurement of the last unit of volume delivered is carried out by the stationary metering device and associated control mechanism.

The operation of the invention is as follows:—
When a delivery is to be effected the operator first starts the pump motor and then takes the discharge nozzle to the operating position whereupon he sets the settable disc 15 by turning the knob 12 until the finger 12ᵃ associated therewith indicates on the dial 12b the number of gallons to be dispensed, the setting of the disc 15 being performed by the finger 13 contacting with the pin 14 and effecting a corresponding turning of the disc 15 the said turning movement being permitted by the slip which is allowed by the friction washer 16. The setting of the disc 15 results in the notch 15ᵃ being moved out of register with the plunger 17ᵃ of the valve rod 17 and the setting movement simultaneously results in the displacement of the plunger 17ᵃ through the valve rod 17 forcing the valve 17b off its seating, leaving the nose of the plunger 17ᵃ resting on the periphery of the settable disc 15. The discharge section of the nozzle is inserted in the reservoir to be filled and the valve 19 opened by the operator lifting the longer arm of the trigger lever 23 in known manner. Delivery proceeds as usual and the flow of liquid as it is being delivered rotates the spiral meter drum 4 and so, through the shafts 4, 8 and 9 and the gear train 6, 7, 8ᵃ and 9ᵃ rotates the settable disc 15 by friction. When the major proportion of the quantity to be delivered has been dispensed the notch 15ᵃ in the settable disc 15 is brought back into register with the plunger 17ᵃ whereupon the valve 17b is rapidly moved on to its seating 17ᶜ by the spring 18 thus imposing a check on delivery and permitting continued delivery to take place at a reduced rate of flow only by way of the dribble passage 17d. The reduction in the rate of flow brings into operation the control mechanism described in the United States Patent No. 2,161,920 so that as soon as the total quantity of liquid to be delivered is dispensed the control mechanism automatically comes into operation to cut off the supply.

It will be understood that the operator holds the trigger lever 23 until cut-off has been effected.

The ordinary mechanism of the meter pump informs the purchaser of the quantity delivered.

It will be appreciated that when used in conjunction with an automatic cut-off mechanism as described in the aforesaid United States patent it is only necessary to employ a metering instrument such as the spiral meter drum 4 which gives purely an approximation of the quantity delivered.

What I claim is:

1. A liquid measuring and dispensing apparatus comprising, in combination, a portable delivery nozzle, a portable metering device adjacent the nozzle, actuated by the flow of liquid to the nozzle, means operated by said metering device for automatically restricting the flow of liquid to a dribble stream when the amount delivered is within one unit of a preselected number of volume units, a stationary metering device, and means controlled by said stationary metering device, upon such restriction of the flow, for automatically arresting the flow after delivery of the next full number of volume units.

2. A liquid measuring and dispensing apparatus comprising, in combination, a portable discharge nozzle having inlet and outlet sections, an auxiliary metering device located within the inlet section and adapted to be actuated by the flow of the liquid as it passes through the inlet section, a valve between the inlet section and the outlet section adapted to restrict the flow to a dribble stream when closed, a settable means for closing the valve, manually controlled means associated with the nozzle for initiating the flow, means operated by the auxiliary metering device for actuating the settable means to close the valve and thereby restrict the flow to a dribble stream when the amount delivered is within one unit of a preselected number of volume units, a stationary metering device, and means controlled by said stationary metering device, upon such restriction of the flow, for automatically arresting the flow after delivery of the next full number of volume units.

3. A liquid measuring and dispensing apparatus comprising, in combination, a portable discharge nozzle having inlet and outlet sections, an auxiliary metering device located within the inlet section and adapted to be actuated by the flow of the liquid as it passes through the inlet section, a valve between the inlet section and the outlet section adapted to restrict the flow to a dribble stream when closed, a shaft driven by the auxiliary metering device, a settable member frictionally driven by said shaft for closing the valve, manually controlled means associated with the nozze for initiating the flow, externally disposed means for setting the settable member to close the valve and thereby restrict the flow of liquid to a dribble stream when the amount delivered is within one unit of a preselected number of volume units, a stationary metering device, and means controlled by said stationary metering device, upon such restriction of the flow, for automatically arresting the flow after delivery of the next full number of volume units.

JOHN FRASER.